United States Patent
Salla et al.

(10) Patent No.: US 10,036,239 B2
(45) Date of Patent: Jul. 31, 2018

(54) GRAPHENE ENHANCED POLYMER COMPOSITES AND METHODS THEREOF

(71) Applicant: Halliburton Energy Services, Inc., Houston, TX (US)

(72) Inventors: Rajender Salla, Maharashtra (IN); Neelam Deepak Raysoni, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 579 days.

(21) Appl. No.: 14/720,342

(22) Filed: May 22, 2015

(65) Prior Publication Data

US 2016/0340570 A1 Nov. 24, 2016

(51) Int. Cl.
*E21B 47/00* (2012.01)
*E21B 49/00* (2006.01)
*C09K 8/03* (2006.01)
*C09K 8/516* (2006.01)

(52) U.S. Cl.
CPC .......... *E21B 47/00* (2013.01); *C09K 8/03* (2013.01); *C09K 8/516* (2013.01); *C09K 2208/10* (2013.01)

(58) Field of Classification Search
CPC ...... E21B 47/00; E21B 49/00; C09K 2208/10
See application file for complete search history.

(56) References Cited

U.S. PATENT DOCUMENTS

| | | | |
|---|---|---|---|
| 6,283,210 B1 | 9/2001 | Soliman et al. | |
| 6,471,169 B1 | 10/2002 | Maloney | |
| 7,091,159 B2 | 8/2006 | Eoff et al. | |
| 7,114,568 B2 | 10/2006 | Eoff et al. | |
| 7,999,027 B2 | 8/2011 | Zhamu et al. | |
| 8,403,051 B2 | 3/2013 | Huang et al. | |
| 8,722,784 B2 | 5/2014 | Chakraborty et al. | |
| 2011/0153296 A1* | 6/2011 | Sadlier | E21B 44/00 703/7 |
| 2012/0245058 A1 | 9/2012 | Monteiro et al. | |
| 2012/0302668 A1 | 11/2012 | Choi et al. | |
| 2013/0072613 A1 | 3/2013 | Miltner et al. | |
| 2013/0274150 A1* | 10/2013 | Holt | C05G 3/0064 507/122 |
| 2014/0018489 A1* | 1/2014 | Johnson | C08K 3/08 524/440 |
| 2015/0198038 A1* | 7/2015 | Bartetzko | E21B 49/00 166/250.05 |

OTHER PUBLICATIONS

Balandin, Alexander A., et al., "Superior Thermal Conductivity of Single-Layer Graphene," Nano Letters, vol. 8, No. 3, Feb. 20, 2008, pp. 902-907.

(Continued)

*Primary Examiner* — Catherine A Loikith
(74) *Attorney, Agent, or Firm* — Haynes and Boone, LLP

(57) ABSTRACT

It has been discovered that blending nano-graphene materials into cross-linked polymer compositions increases the thermal degradation resistance and compressive strength of the graphene enhanced polymer composites formed. Graphene enhanced polymer composites and their methods of use provide improved relative permeability modifiers for conformance applications.

22 Claims, 1 Drawing Sheet

(56) References Cited

OTHER PUBLICATIONS

Choi, Eun-Young, et al., "Noncovalent Functionalization of Graphene with End-Functional Polymers," Journal of Materials Chemistry 20(10), Jan. 20, 2010, pp. 1907-1912.

Georgakilas, Vasilios, et al., "Functionalization of Graphene: Covalent and Non-Covalent Approaches, Derivatives and Applications," Chemical Reviews 112 (11), Sep. 25, 2012, pp. 6156-6214.

Lee, Changgu, et al., "Measurement of the Elastic Properties and Intrinsic Strength of Monolayer Graphene," Science, vol. 321, Jul. 18, 2008, pp. 385-388.

Mak, Kin Fai, et al., "Optical Spectroscopy of Graphene: From the Far Infrared to the Ultraviolet," Solid State Communications 152, Apr. 26, 2012, pp. 1341-1349.

Steurer, Peter, et al., "Functionalized Graphenes and Thermoplastic Nanocomposites Based Upon Expanded Graphite Oxide," Macromolecular Rapid Communications, vol. 30, Jan. 8, 2009, pp. 316-327.

* cited by examiner

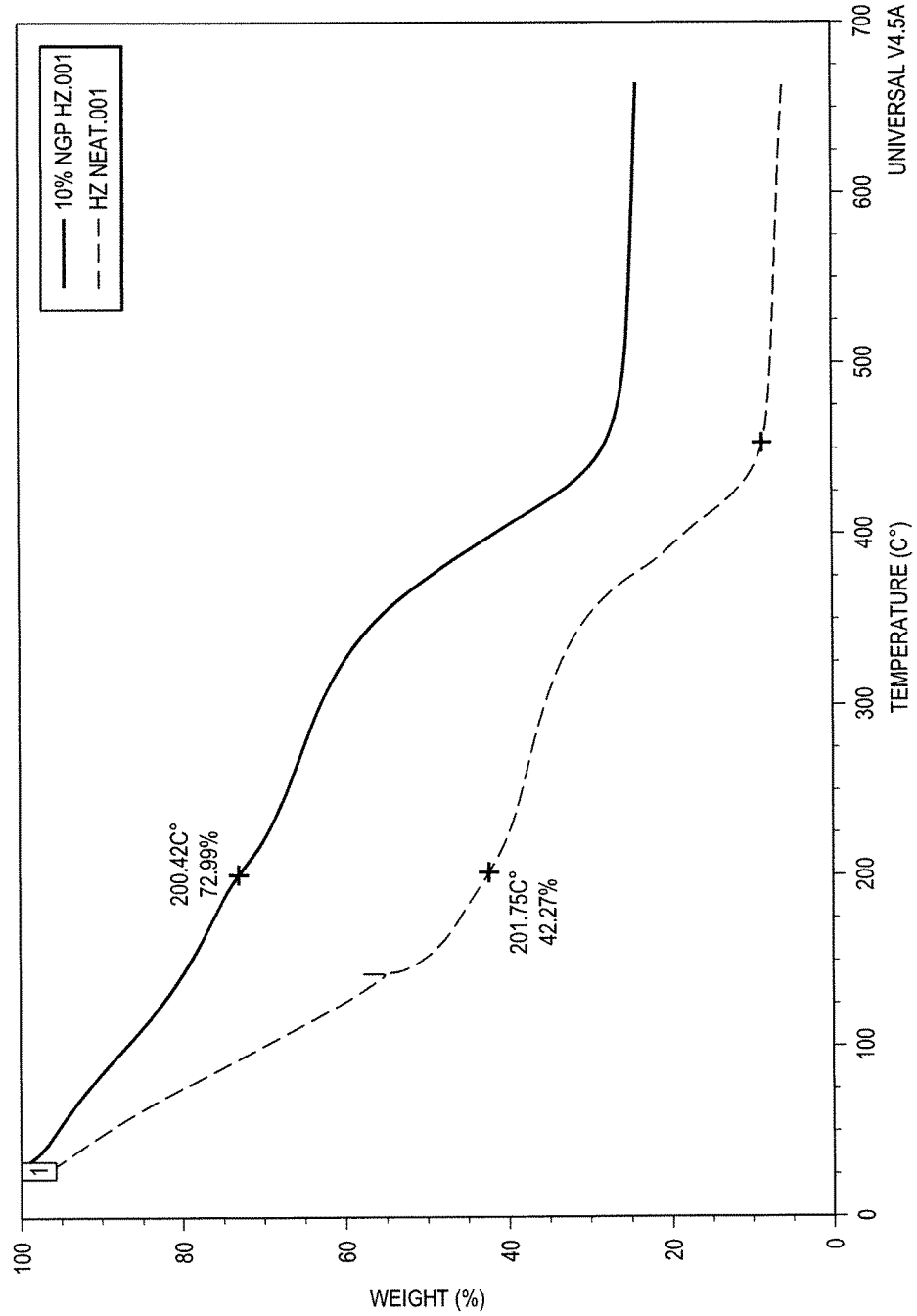

GRAPHENE ENHANCED POLYMER COMPOSITES AND METHODS THEREOF

FIELD

The present disclosure relates to a cross-linked polymer blended with a graphene material to form graphene-enhanced polymer composites, and methods of using the same. The cured graphene-enhanced polymer composite has been found to have improved mechanical strength and thermal degradation resistance relative to the cross-linked polymer alone. The graphene-enhanced polymer composite can be applied in conformance applications to increase the lifetimes and stress ranges of polymer compositions, such as relative permeability modifiers.

BACKGROUND

Hydrocarbon production typically requires using a drill bit to drill through subterranean formations to form a wellbore that extends through the subterranean formation. Typically, a drilling fluid is circulated through an annulus (or space) between the drill bit and the surface of the wellbore. The drilling fluid cools and lubricates the drill bit while removing the drill shavings from the bottom of the drill string being formed.

Once the desired drilling depth is reached, slurry containing a cement composition can be added into the annular space between the walls of the wellbore and the pipe string to isolate the pipe string from the subterranean zones.

One of the methods used to increase the production of oil and gas from a subterranean formation is to pump polymer compositions and proppants into various portions of the wellbore under high pressure. The high pressure fractures the subterranean formation surrounding the wellbore to increase the permeability of the subterranean formation. The polymer compositions and proppants prevent or reduce the amount of porosity that would be lost once the pressure is reduced. This method is known as hydraulic fracturing or "fracking."

One of the significant challenges associated with hydraulic fracturing is to increase the mechanical strength of the polymer compositions and proppants used to minimize the number of fractures that are sealed by the overburden pressure of the subterranean formation. If the pressure of the subterranean formation exceeds the strength of the polymer compositions and proppants, then the subterranean formation surrounding the wellbore will lose permeability. This loss of permeability results in either lowered production volumes or longer production times. There is a need for polymer compositions and proppants having improved mechanical strength.

Another challenge associated with hydraulic fracturing is to selectively produce hydrocarbons. Unfortunately, the higher permeability that increases the production of hydrocarbons can also increase the production of undesirable liquids, such as water, which mix with the oil and gas being produced. Polymers known as relative permeability modifiers (RPMs) have been developed to coat the fractured subterranean formation with hydrophilic and hydrophobic materials that facilitate the production of hydrocarbons while minimizing the amount of water produced. However, the relative permeability modifiers are subject to the variable pressures and temperatures of the various stages of conformance and production, which can lead to degradation of the relative permeability modifier over time. The degradation of the relative permeability modifier allows the amount of water produced with the hydrocarbons to increase, which requires the subsequent removal of the water from the produced oil and gas. There is a need for a relative permeability modifier having increased resistance to thermal degradation and mechanical strength to improve the lifetimes and stress ranges of relative permeability modifiers.

SUMMARY

A graphene-enhanced polymer composite is disclosed herein. According to several exemplary embodiments, the graphene-enhanced polymer composite includes: from about 0.01% w/v to about 10% w/v of a nano-graphene material; and a cross-linked polymer, wherein the cross-linked polymer is: a reaction product of (1) a hydrophilic reactive polymer and (2) (a) a hydrophobic compound or (b) a hydrophilic compound, wherein the hydrophilic reactive polymer comprises a reactive amino group, or a copolymerization product of (1) a hydrophilic monomer and (2) a hydrophobically modified hydrophilic monomer.

A method of reducing water permeability of a wellbore in a subterranean formation is disclosed herein. According to several exemplary embodiments, the method includes: introducing a relative permeability modifier comprising a graphene-enhanced polymer composite into the wellbore; the graphene-enhanced polymer composite comprising: from about 0.01% w/v to about 10% w/v of a nano-graphene material; and a cross-linked polymer, wherein the cross-linked polymer is: a reaction product of a hydrophilic reactive polymer and a hydrophobic compound or a hydrophilic compound, wherein the hydrophilic reactive polymer comprises a reactive amino group, or a copolymerization product of a hydrophilic monomer and a hydrophobically modified hydrophilic monomer.

It has been found that blending graphene materials into a cross-linked polymer forms graphene-enhanced polymer composites, as disclosed herein, that have greatly increased the mechanical strength and thermal degradation resistance relative to the cross-linked polymer alone. These graphene-enhanced polymer composites can provide relative permeability modifiers with improved resistance to degradation across broader thermal and pressure conditions.

BRIEF DESCRIPTION OF THE DRAWING

The following description of the drawing is merely an embodiment of the disclosure and should not be considered limiting. Also, the drawing is merely a depiction of embodiments and is not drawn to scale.

The FIGURE plots the percentage of weight loss of an embodiment of the graphene-enhanced polymer composite as a function of temperature.

DETAILED DESCRIPTION

The term "about" indicates a range which includes ±5% when used to describe a single number. When applied to a range, the term "about" indicates that the range includes −5% of a numerical lower boundary and +5% of an upper numerical boundary. For example, a range of from about 100° C. to about 200° C., includes a range of from 95° C. to 210° C. However, when the term "about" modifies a percentage, then the term means ±1% of the number or numerical boundaries, unless the lower boundary is 0%. Thus, a range of 5-10%, includes 4-11%. A range of 0-5%, includes 0-6%.

Unless indicated otherwise, all measurements have metric units.

Unless otherwise noted, the term "alkyl" means an alkyl group having from about 4 to about 30 carbon atoms.

Unless indicated otherwise, the terms "a," "an," or "the" can refer to one or more than one of the noun they modify.

A graphene-enhanced polymer composite is disclosed herein. According to several exemplary embodiments, the graphene-enhanced polymer composite includes: from about 0.01% w/v to about 10% w/v of a nano-graphene material based on a volume of the graphene-enhanced polymer composite, which can include an aqueous solution. According to several exemplary embodiments, the graphene-enhanced polymer composite includes a cross-linked polymer, wherein the cross-linked polymer is: a reaction product of (1) a hydrophilic reactive polymer and (a) a hydrophobic compound or (b) a hydrophilic compound, wherein the hydrophilic reactive polymer comprises a reactive amino group, or a copolymerization product of (1) a hydrophilic monomer and (2) a hydrophobically modified hydrophilic monomer. According to several exemplary embodiments, the cross-linked polymer that is a reaction product of a hydrophilic reactive polymer and a hydrophobic compound; a reaction product of a hydrophilic reactive polymer and a hydrophilic compound; or a copolymerization product of a hydrophilic monomer and a hydrophobically modified hydrophilic monomer.

According to several exemplary embodiments, the cross-linked polymer is the reaction product of (1) a hydrophilic reactive polymer and (2) (a) a hydrophobic compound or (b) a hydrophilic compound. According to several exemplary embodiments, hydrophilic reactive polymers suitable for use in the aqueous solutions are polymers containing reactive amino groups in the polymer backbone or as pendant groups. According to several exemplary embodiments, the hydrophilic reactive polymers have dialkyl amino pendant groups. According to several exemplary embodiments, the hydrophilic reactive polymer has a dimethyl amino pendant group and is the product of a polymerization reaction in which at least one monomer is selected from dimethylaminoethyl methacrylate and dimethylaminopropyl methacrylamide. According to several exemplary embodiments, the hydrophilic reactive polymer includes homo-, co- or terpolymers. According to several exemplary embodiments, the hydrophilic reactive polymer includes polyethyleneimine, polyvinylamine, polyamine, poly(vinylamine/vinyl alcohol), chitosan, polylysine and alkyl acrylate polymers. According to several exemplary embodiments, alkyl acrylate polymers include polydimethylaminoethyl methacrylate, polydimethylaminopropyl methacrylamide, poly(acrylamide/dimethylaminoethyl methacrylate), poly(acrylamide/dimethylaminopropyl methacrylamide), poly(acrylic acid/dimethylaminoethyl methacrylate), and poly(acrylamide/tertiary butyl acrylate). According to several exemplary embodiments, the hydrophilic reactive polymer is at least one of polydimethylaminoethyl methacrylate and polydimethylaminopropyl methacrylamide.

According to several exemplary embodiments, hydrophobic compounds suitable for reaction with the hydrophilic reactive polymers include at least one of an alkyl halide having from about 4 to about 30 carbons and a bisphenol epoxide. According to several exemplary embodiments, the alkyl chain portion of the hydrophobic compound has from about 4 to about 30 carbons. According to several exemplary embodiments, the hydrophobic compound is a bisphenol epoxide resin. According to several exemplary embodiments, the hydrophobic compound is cetyl bromide. According to several exemplary embodiments, hydrophilic compounds suitable for reaction with the hydrophilic reactive polymers include acrylamide-co-acrylate ester copolymers, or a halogen containing polyether, wherein the polyether is selected from the group consisting of polyethylene oxide, polypropylene oxide, polybutylene oxide, and mixtures thereof.

According to several exemplary embodiments, the cross-linked polymer is a reaction product of polyethyleneimine and acrylamide-co-acrylate ester copolymer. According to several exemplary embodiments, the cross-linked polymer is the H$_2$ZERO® SYSTEM, which is commercially available from Halliburton Energy Services, Inc. The H$_2$ZERO® SYSTEM is a combination of HZ-10 polymer (poly(acrylamide-co-acrylate ester) copolymer) and HZ-20 crosslinker (polyethyleneimine).

According to several exemplary embodiments, the cross-linked polymer is EXPEDITE® 350, which is commercially available from Halliburton Energy Services, Inc. Expedite 350 is a combination of polyamine and bisphenol epoxide resin.

According to several exemplary embodiments, the cross-linked polymer is a copolymerization product of a hydrophilic monomer and a hydrophobically modified hydrophilic monomer. These copolymerization reactions are known to those skilled in the art as represented by U.S. Pat. No. 6,476,169, the entire disclosure of which is incorporated herein by reference.

According to several exemplary embodiments, the hydrophilic monomer includes acrylamide, 2-acrylamido-2-methyl propane sulfonic acid, N,N-dimethylacrylamide, vinyl pyrrolidone, dimethylaminoethyl methacrylate, acrylic acid, dimethylaminopropyl methacrylamide, vinyl amine, trimethylammoniumethyl methacrylate chloride, methacrylamide and hydroxyethyl acrylate. According to several exemplary embodiments, hydrophilic monomers include acrylamide, 2-acrylamido-2-methyl propane sulfonic acid, acrylic acid, dimethylaminoethyl methacrylate, dimethylaminopropyl methacrylamide, and vinyl pyrrolidone.

According to several exemplary embodiments, the hydrophobically modified hydrophilic monomers include alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammoniumpropyl methacrylamide bromide, alkyl dimethylammoniumpropyl methacrylamide chloride, and alkyl dimethylammoniumpropyl methacrylamide iodide, wherein the alkyl groups have from about 4 to about 22 carbon atoms.

According to several exemplary embodiments, the hydrophobically modified hydrophilic monomers include octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, and hexadecyl methacrylamide.

According to several exemplary embodiments, the cross-linked polymer has a weight average molecular weight in the range of from about 250,000 Daltons to about 3,000,000 Daltons, or from about 500,000 Daltons to 2,000,000 Daltons. According to several exemplary embodiments, a cross-linked polymer is a reaction product of components having a mole ratio of hydrophilic reactive polymer to a hydrophobic compound or a hydrophilic compound of from about 1:10 to about 1:100 or from about 1:20 to about 1:80. According to several exemplary embodiments, the cross-linked polymer is a copolymerization product of components having a mole ratio of hydrophilic monomer to hydrophobically modified hydrophilic monomer of about 10:1 to about 1:10, or from about 5:1 to about 1:5.

According to several exemplary embodiments, the nano-graphene material comprises a nano-graphene plate powder, a nano-graphene ribbon, a functionalized graphene, a graphene oxide, and combinations thereof. Graphene is an allotrope of carbon, whose structure is a planar sheet of $sp^2$-bonded graphite atoms that are densely packed in a 2-dimensional honeycomb crystal lattice. However, graphene can take on a variety of sizes and shapes. "Nano-graphene" is defined as graphene having no dimension greater than 1 μm or 1000 nm and that is substantially planar, which excludes tubes and spheres, such as carbon nanotubes, fullerenes, and the like.

According to several exemplary embodiments, the nano-graphene materials comprise a nano-graphene plate powder. Nano-graphene plate powder has been found to have excellent thermal conductivity, electrical conductivity, high-temperature resistance, high corrosion resistance, a low friction coefficient, and good self-lubricating properties. According to several exemplary embodiments, the nano-graphene plate powder has a particle size of from about 5 nm to about 100 nm, from about 10 nm to about 80 nm, from about 30 nm to about 300 nm, or from about 50 nm to about 200 nm. According to several exemplary embodiments, the nano-graphene plate powder has a particle thickness of from about 1 nm to about 100 nm, or from about 5 nm to about 50 nm. According to several exemplary embodiments, the nano-graphene plate powder has a ratio of particle size to particle thickness of about 10:1 to about 30:1, or about 15:1 to about 25:1. According to several exemplary embodiments, the nano-graphene plate powder has a specific gravity from about 1.5 g/cc to about 2.5 g/cc, or about 2.12 g/cc. According to several exemplary embodiments, the nano-graphene plate powder has a bulk density from about 0.01 g/cc to about 0.8 g/cc. According to several exemplary embodiments, the nano-graphene plate powder has a surface area of from about 200 $m^2$/g to about 800 $m^2$/g, from about 400 $m^2$/g to about 800 $m^2$/g, or about 750 $m^2$/g. According to several exemplary embodiments, the nano-graphene plate powder has a tensile strength of from about 3.0 GPa to about 7.0 GPa, or about 5.0 GPa. According to several exemplary embodiments, the nano-graphene plate powder has a tensile modulus of about 500 GPa to about 1500 GPa.

According to several exemplary embodiments, the nano-graphene is surface functionalized by methods known to those of skill in the art. One benefit of such functionalization is the introduction of functional groups that facilitate the processing of the nano-graphene or alter the properties of the nano-graphene. According to several exemplary embodiments, the functionalized graphene has at least one functional group selected from the group consisting of a sulfonate, a sulfate, a sulfosuccinate, a thiosulfate, a succinate, a carboxylate, a hydroxyl, a glucoside, an ethoxylate, a propoxylate, a phosphate, an ether, an amine, an amide, and combinations thereof.

According to several exemplary embodiments, a graphene-enhanced polymer composite contains from about 0.01% w/v to about 15% w/v, or about 1.0% w/v to about 5.0% w/v of a nano-graphene material relative to the volume of the graphene-enhanced polymer composite. For example, a graphene-enhanced polymer composite can contain 0.1 g graphene per 1 mL of graphene-enhanced polymer composite.

A relative permeability modifier is disclosed herein. According to several exemplary embodiments, the relative permeability modifier includes a graphene-enhanced polymer composite. According to several exemplary embodiments, the graphene-enhanced polymer composite includes a base fluid. According to several exemplary embodiments, the base fluid is an aqueous fluid that includes at least 50% by weight of water. According to several exemplary embodiments, the aqueous fluid is a brine containing a mineral salt, such as sodium chloride. According to several exemplary embodiments, the relative permeability modifier contains from about 0.1% by weight to about 3.0% by weight or about 0.3% by weight to about 2.0% by weight of the graphene-enhanced polymer composite based on the weight of the relative permeability modifier.

A method of reducing water permeability of a wellbore in a subterranean formation is disclosed. According to several exemplary embodiments, the method reduces the water permeability of a wellbore in need thereof. According to several exemplary embodiments, the method includes locating a lost circulation zone in the wellbore by applying a detection method to the wellbore. According to several exemplary embodiments, the lost circulation zone is detected by a detection method that includes at least one of magnetic resonance imaging, resistivity imaging, gamma ray imaging, neutron density imaging, sonic imaging, and caliper imaging.

According to several exemplary embodiments, a magnetic resonance imaging logging (MRIL) tool operates on known magnetic resonance imaging principles which include obtaining a response from the naturally abundant hydrogen protons in formation fluids, such as water, oil, and gas. According to several exemplary embodiments, detection by magnetic resonance imaging logging provides information, such as the total porosity, irreducible water saturation (which indicates rock texture), water-cut prediction (when integrated with conventional open-hole logs), permeability (by combining the porosity, free fluid and bound fluid predictions), and fluid quantification (oil, water, or gas), regardless of the type of subterranean environment. According to several exemplary embodiments, a benefit of magnetic resonance imaging is the determination of water presence and water mobility, which are indicators of lost circulation zones. According to several exemplary embodiments, the method further includes a step of placing the water permeability modifier to the wellbore within 50 meters of a lost circulation zone detected by a detection method.

Conformance applications typically include pumping chemicals to eliminate or reduce unwanted water production. For example, many conformance applications pump into a wellbore water and polymers that crosslink to form a plugging substance that mitigates water production. According to several exemplary embodiments, one benefit of applying a detection method to determine the location of a lost circulation zone is that the lost circulation zone is then selectively contacted with a relative permeability modifier that is appropriate for the size of the pores and the amount of water passing into the wellbore.

According to several exemplary embodiments, the method of reducing water permeability of a wellbore in a subterranean formation includes: introducing a relative permeability modifier including a graphene-enhanced polymer composite into the wellbore; the graphene-enhanced polymer composite including: from about 0.01% w/v to about 10% w/v of a nano-graphene material; and a cross-linked polymer, wherein the cross-linked polymer is: a reaction product of a hydrophilic reactive polymer and a hydrophobic compound or a hydrophilic compound, wherein the hydrophilic reactive polymer comprises a reactive amino group, or a copolymerization product of a hydrophilic monomer and a hydrophobically modified hydrophilic monomer.

According to several exemplary embodiments, the method further includes a step of detecting degradation of the graphene-enhanced polymer composite during production by applying at least one of UV spectroscopy, IR spectroscopy, and Raman spectroscopy to a production fluid. A production fluid is defined as a fluid that has been removed from the subterranean formation by way of the wellbore. One benefit of using nano-graphene enhanced polymer composites in relative permeability modifiers is that the graphene materials have unique absorbance profiles for UV (ultraviolet), IR (infrared), and Raman spectroscopy. This allows for graphene in the production fluids to be detected and quantified. According to several exemplary embodiments, the method further includes a step of detecting degradation of the graphene-enhanced polymer composite during production by applying at least one of UV spectroscopy, IR spectroscopy, and Raman spectroscopy to a production fluid. The ability to detect degradation of the relative permeability modifier over time will allow well operators to determine when the relative permeability modifier should be replaced.

The following examples are illustrative of the compositions and methods discussed above.

Examples

In Example 1, 10% w/v of nano-graphene plate powder was blended with a cross-linkable cross-linked polymer (the H₂ZERO® SYSTEM, commercially available from Halliburton Energy Services, Inc.) into a homogenous mixture. Control 1 was prepared according to the same procedure as Example 1, except no nano-graphene plate powder was added to the cross-linkable cross-linked polymer of Control 1. Referring to FIG. 1, the samples prepared according to Example 1 ("10% NGP HZ.001") and Control 1 ("HZ Neat.001") were heated at a rate of 5° C./min to 10° C./min for 1.5 hours to temperatures that included 201° C.±1° C. During this time, the weight of the sample prepared according to Example 1 was observed to decrease to 72.99% by weight of its original weight, whereas the weight of Control 1 was observed to decrease to 42.27% by weight of its original weight. This test confirmed that the sample prepared according to Control 1 degraded more than the sample prepared according to Example 1 by 30 weight percent. Because the only difference between Example 1 and Control 1 was the omission of nano-graphene plate powder, it is clear that the inclusion of nano-graphene plate powder increases the thermal stability of the cross-linked polymer.

In Example 2, natural sand was coated with a cross-linked polymer that included 0.075 weight percent of percent nano-graphene plate powder and 3.0 weight percent of EXPEDITE® 350 (1:1 A+B, which are polyamine and a bisphenol epoxide resin) in a solution of base fluid. The base fluid is a resin system, such as epoxy resin and amine hardener. EXPEDITE® 350 is commercially available from Halliburton Energy Services, Inc. The coated sand was cured in an autoclave at 3000 psi for 24 to 48 hours at 180° F. to 350° F. Control 2 was prepared according to the same procedure, except no nano-graphene plate powder was added.

TABLE 1

| Sample | Nano-Graphene Platelet Powder | Cross-linked polymer | Unconfined Compressive Strength (UCS) |
|---|---|---|---|
| Example 2 | 0.075 wt. % | 3.0 wt. % EXPEDITE ® 350 (1:1 A +B) in solution | 1638 |
| Control 2 | 0.000 wt. % | 3.0 wt. % EXPEDITE ® 350 (1:1 A + B) in solution | 1352 |

The unconfined pressure strength of the samples prepared according to Example 2 and Comparative Example 2 was measured using a Compute Full-Automatic Compression System, Model WHY-300, made by Shanghai Hualong Test Instruments Co. LTD, China. The results shown in Table 1 clearly indicate that the strength of the polymer improves by more than 20 percent due to the addition of the nano-graphene platelet powder to the EXPEDITE® 350 polymer.

The increased resistance to thermal degradation and increased strength demonstrated by Examples 1 and 2, respectively, are of tremendous importance to industries where polymers must endure high temperatures, pressures, and water vapor. For example, the H₂ZERO® SYSTEM often serves as a relative permeability modifier used in completion procedures, but this material has been found to degrade at temperatures of 400° F. in wellbores. According to several exemplary embodiments, the graphene-enhanced polymer composites disclosed herein can extend the functional range of pressure and temperature of the H₂ZERO® SYSTEM.

While the present invention has been described in terms of certain embodiments, those of ordinary skill in the art will recognize that the invention can be practiced with modification within the spirit and scope of the appended claims.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A graphene-enhanced polymer composite comprising:
   from about 0.01% w/v to about 10% w/v of a nano-graphene material; and
   a cross-linked polymer, wherein the cross-linked polymer is:
   a reaction product of (1) a hydrophilic reactive polymer and (2) (a) a hydrophobic compound or (b) a hydrophilic compound, wherein the hydrophilic reactive polymer comprises a reactive amino group, or
   a copolymerization product of (1) a hydrophilic monomer and (2) a hydrophobically modified hydrophilic monomer.

2. The graphene-enhanced polymer composite of claim 1, wherein the hydrophilic reactive polymer is selected from polyethyleneimine, polyvinylamine, polyamine, poly(vinylamine/vinyl alcohol), chitosan, polylysine, and an alkyl acrylate polymer.

3. The graphene-enhanced polymer composite of claim 1, wherein the hydrophobic compound comprises at least one of an alkyl halide having from about 4 to about 30 carbons and a bisphenol epoxide.

4. The graphene-enhanced polymer composite of claim 1, wherein the hydrophilic compound comprises an acrylamide-co-acrylate ester copolymer, or
 a halogen containing polyether, wherein the polyether is selected from the group consisting of polyethylene oxide, polypropylene oxide, polybutylene oxide, and mixtures thereof.

5. The graphene-enhanced polymer composite of claim 1, wherein the hydrophilic monomer is selected from acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, trimethylammoniumethyl methacrylate chloride, methacrylamide, and hydroxyethyl acrylate.

6. The graphene-enhanced polymer composite of claim 1, wherein the hydrophobically modified hydrophilic monomer is selected from alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammoniumpropyl methacrylamide bromide, alkyl dimethylammoniumpropyl methacrylamide chloride, and alkyl dimethylammoniumpropyl methacrylamide iodide, wherein the alkyl groups have from about 4 to about 22 carbon atoms.

7. The graphene-enhanced polymer composite of claim 1, wherein the nano-graphene material comprises a nano-graphene plate powder, a nano-graphene ribbon, a functionalized graphene, a graphene oxide, and combinations thereof.

8. The graphene-enhanced polymer composite of claim 7, wherein the functionalized graphene has at least one functional group selected from a sulfonate, a sulfate, a sulfosuccinate, a thiosulfate, a succinate, a carboxylate, a hydroxyl, a glucoside, an ethoxylate, a propoxylate, a phosphate, an ether, an amine, an amide, and combinations thereof.

9. The graphene-enhanced polymer composite of claim 1, wherein the nano-graphene materials comprise a nano-graphene plate powder having a particle size of from about 30 nm to about 300 nm and a particle thickness of from about 1 nm to about 100 nm.

10. The graphene-enhanced polymer composite of claim 9, wherein the nano-graphene plate powder has a ratio of the particle size to the particle thickness of about 10:1 to about 30:1.

11. A method of reducing water permeability of a wellbore in a subterranean formation, comprising:
 introducing a relative permeability modifier comprising a graphene-enhanced polymer composite into the wellbore;
 the graphene-enhanced polymer composite comprising:
 from about 0.01% w/v to about 10% w/v of a nano-graphene material; and
 a cross-linked polymer, wherein the cross-linked polymer is:
 a reaction product of (1) a hydrophilic reactive polymer and (2) (a) a hydrophobic compound or (b) a hydrophilic compound, wherein the hydrophilic reactive polymer comprises a reactive amino group, or
 a copolymerization product of (1) a hydrophilic monomer and (2) a hydrophobically modified hydrophilic monomer.

12. The method of claim 11, wherein the hydrophilic reactive polymer is selected from polyethyleneimine, polyvinylamine, polyamine, poly(vinylamine/vinyl alcohol), chitosan, polylysine, and an alkyl acrylate polymer.

13. The method of claim 11, wherein the hydrophobic compound comprises at least one of an alkyl halide having from about 4 to about 30 carbons and a bisphenol epoxide, or
 wherein the hydrophilic compound comprises an acrylamide-co-acrylate ester copolymer, or a halogen containing polyether, wherein the polyether is selected from the group consisting of polyethylene oxide, polypropylene oxide, polybutylene oxide, and mixtures thereof.

14. The method of claim 11, wherein the hydrophilic monomer is selected from acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, trimethylammoniumethyl methacrylate chloride, methacrylamide, and hydroxyethyl acrylate.

15. The method of claim 11, wherein the hydrophobically modified hydrophilic monomer is selected from alkyl acrylates, alkyl methacrylates, alkyl acrylamides, alkyl methacrylamides, alkyl dimethylammoniumethyl methacrylate bromide, alkyl dimethylammoniumethyl methacrylate chloride, alkyl dimethylammoniumethyl methacrylate iodide, alkyl dimethylammoniumpropyl methacrylamide bromide, alkyl dimethylammoniumpropyl methacrylamide chloride, and alkyl dimethylammoniumpropyl methacrylamide iodide, wherein the alkyl groups have from about 4 to about 22 carbon atoms.

16. The method of claim 11, wherein the nano-graphene material comprises a nano-graphene plate powder, a nano-graphene ribbon, a functionalized graphene, a graphene oxide, and combinations thereof.

17. The method of claim 16, wherein the functionalized graphene has at least one functional group selected from a sulfonate, a sulfate, a sulfosuccinate, a thiosulfate, a succinate, a carboxylate, a hydroxyl, a glucoside, an ethoxylate, a propoxylate, a phosphate, an ether, an amine, an amide, and combinations thereof.

18. The method of claim 11, wherein the nano-graphene materials comprise a nano-graphene plate powder having a particle size of from about 30 nm to about 300 nm and a particle thickness of from about 1 nm to about 100 nm.

19. The method of claim 18, wherein the nano-graphene materials comprise a nano-graphene plate powder having a ratio of the particle size to the particle thickness of about 10:1 to about 30:1.

20. The method of claim 11, further comprising, before introducing the relative permeability modifier,
 locating a lost circulation zone in the wellbore by applying a detection method to the wellbore,
 wherein the detection method is at least one selected from the group consisting of magnetic resonance imaging, resistivity imaging, gamma ray imaging, neutron density imaging, sonic imaging, and caliper imaging.

21. The method of claim 11, wherein the relative permeability modifier is introduced during or after completion of the wellbore, and before production of the wellbore.

22. The method of claim 11, further comprising, detecting degradation of the graphene-enhanced polymer composite during production by applying at least one of UV spectroscopy, IR spectroscopy, and Raman spectroscopy to a production fluid.

* * * * *